(12) United States Patent
Stumpe et al.

(10) Patent No.: US 6,672,683 B1
(45) Date of Patent: Jan. 6, 2004

(54) ELECTRONICALLY REGULATED BRAKE SYSTEM

(75) Inventors: Werner Stumpe, Stuttgart (DE); Herbert Schramm, Leonhard (DE); Claus Beyer, Ludwigsburg (DE); Juergen Wrede, Bietigheim-Bissingen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 09/979,277

(22) PCT Filed: May 19, 2000

(86) PCT No.: PCT/EP00/04555

§ 371 (c)(1), (2), (4) Date: Jun. 27, 2002

(87) PCT Pub. No.: WO00/71400

PCT Pub. Date: Nov. 30, 2000

(30) Foreign Application Priority Data

May 21, 1999 (DE) .......................................... 199 23 458

(51) Int. Cl.$^7$ .............................................. B60T 13/74
(52) U.S. Cl. ............................................ 303/3; 303/186
(58) Field of Search ................................ 303/3, 15, 20, 303/186, 187

(56) References Cited

U.S. PATENT DOCUMENTS

| | | | |
|---|---|---|---|
| 5,118,169 A | 6/1992 | Moeller | |
| 5,255,962 A | * 10/1993 | Heuhaus et al. | 303/111 |
| 5,462,342 A | * 10/1995 | Goebels | 303/113.2 |
| 5,575,543 A | * 11/1996 | Pheonix | 303/155 |

FOREIGN PATENT DOCUMENTS

| | | |
|---|---|---|
| DE | 3215475 | 11/1983 |
| DE | 4008095 | 9/1991 |
| DE | 4227083 | 2/1994 |
| EP | 0304310 | 7/1988 |
| EP | 0467112 | 6/1991 |
| EP | 0304610 B1 | 12/1992 |
| EP | 0652145 | 11/1994 |
| EP | 0652146 A1 | 5/1995 |
| EP | 0845397 | 11/1997 |

OTHER PUBLICATIONS

English translation of Elektronisch Geregelte Nutzfahrzeugbremse (Electronically Controlled Brakes for Commercial Vehicles), ATZ Automobiltechnische Zeitschrift, vol. 96, No. 9 (1994), pp. 506–508, 510.

Decker et al., "Electronically Controlled Brakes for Commercial Vehicles", ATZ Automobiltechnische Zeitschrift, vol. 96, No. 9 (1994), pp. 506–508,510.

* cited by examiner

*Primary Examiner*—Christopher P. Schwartz
(74) *Attorney, Agent, or Firm*—Crowell & Moring LLP

(57) ABSTRACT

The invention relates to an electronically regulated brake system comprising a central control device (Z1; Z2) and at least one pressure control valve (A). According to the invention, the electronically regulated brake system additionally includes at least one pressure regulating valve (B) and/or at least one pressure regulating module (C).

12 Claims, 1 Drawing Sheet

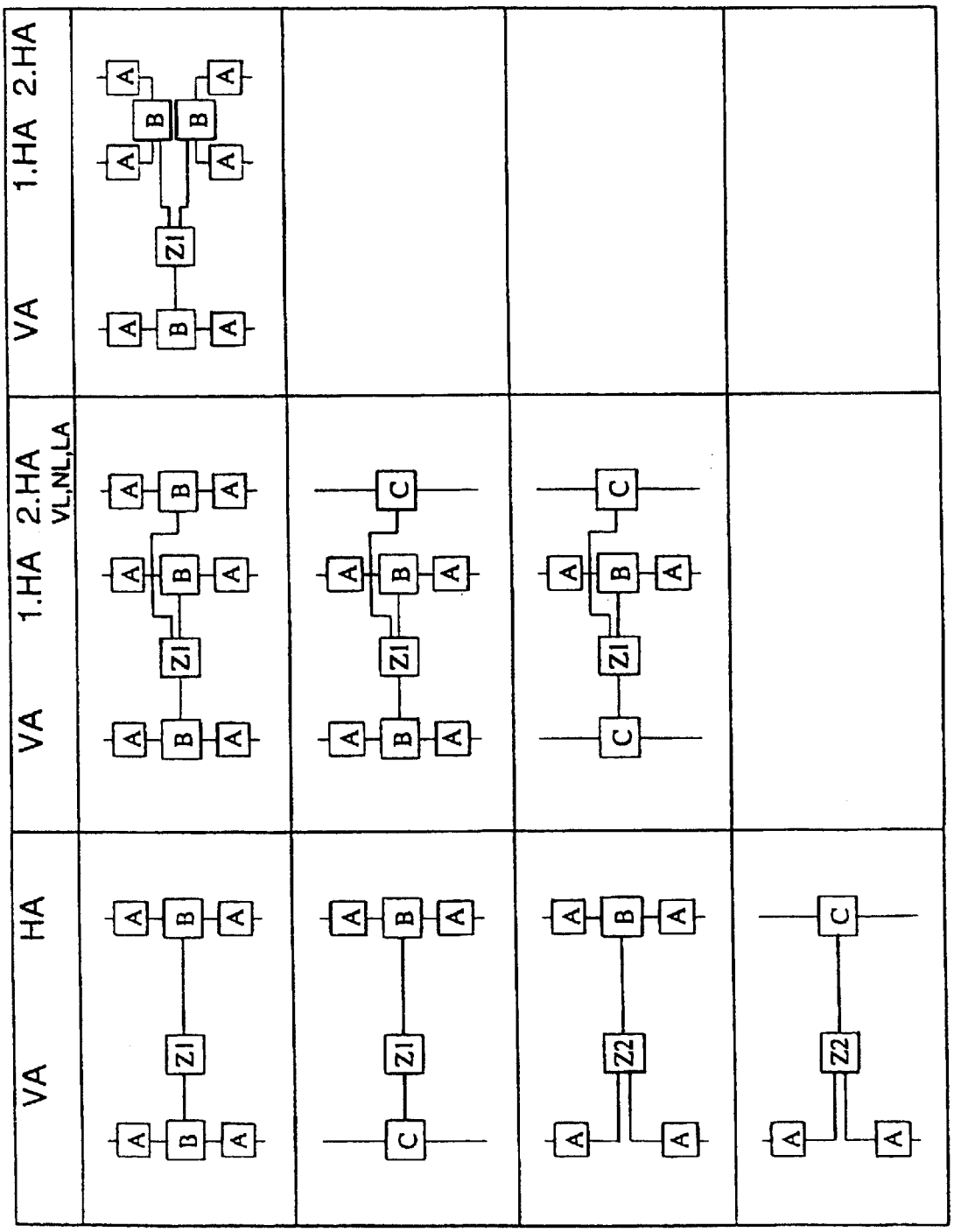

ELECTRONICALLY REGULATED BRAKE SYSTEM

BACKGROUND AND SUMMARY OF THE INVENTION

The invention is based on an electronically controlled braking system.

According to the state of the art, as described, for example, in an article entitled "Elektronisch geregelte Nutzfahrzeugbremse [Electronically Controlled Commercial Vehicle Brake]" in ATZ Automobiltechnische Zeitschrift 96 (1994) September, No. 9, electronically controlled braking systems in commercial vehicles are known. These systems feature at least one pressure control valve and at least one pressure regulation valve, or at least one pressure control valve, at least one pressure regulation valve, and at least one pressure regulation module. The pressure control valve is assigned to one vehicle wheel and is designed for wheel slippage-dependent control of brake pressure applied to a brake of the wheel and generated by a braking power actuator or a brake valve that can be activated by the driver or by a pressure regulation valve. The pressure regulation valve is designed for generation of driver-controlled brake pressure and features a pressure sensor to monitor brake pressure, as well as control electronics, with which the brake pressure can be regulated, by the comparison, between the pressure reference value and the actual value, wherein the pressure is applied axlewise or sidewise. This pressure can be transmitted to the wheel-specific pressure control valve, of which there is at least one. The pressure regulation module is designed for generation of driver-controlled brake pressure and features a pressure sensor to monitor brake pressure, as well as control electronics, with which the brake pressure can be regulated, by variance comparison, axle-by-axle. The pressure can be transmitted to at least one wheel brake, and can be controlled on a wheel-by-wheel basis depending on wheel slippage. The central control device only communicates with the pressure regulation valve, of which there is at least one, and the pressure regulation module, of which there is at least one. Alternatively, the pressure regulation valve, of which there is at least one, or the central control device only communicates with the pressure control valve, of which there is at least one, and with the pressure regulation valve, of which there is at least one. Brake pressure generated by the driver-actuated brake power actuator or the brake valve can be directly applied, to the pressure control valve.

Wheel slippage-dependent controls for ABS (Anti-Lock Braking System) and/or TCS (Traction Control System) are integrated into the electronic braking system. This is done so that each brake pressure value is also controlled, depending on the rotational behavior of the braked wheels, by the pressure control valves positioned downstream from the pressure regulation valves close to the wheels.

During this process, however, the data transmitted from the pressure control valves and sensors to the central control device, and in the opposite direction, must travel relatively long distances, which is disadvantageous for fast wheel traction control systems. Furthermore, the braking system described above is very costly to execute, especially in multi-axle vehicles, due to the high cost of assembly and cable installation required to connect the sensors and valves, which are arranged at a considerable distance, with the central control device.

German patent document DE 42 27 083 A1 describes an electronic braking system for road vehicles, in which the entire electronic system is divided into two units that communicate with one another. One electronic unit is assigned to the electronic unit of a pressure regulation module and the other electronic unit is assigned to up to two pressure control valves.

European patent document 0 652 146 A1 discloses an electronic braking control system with a multitude of pressure control valves, which are assigned local regulating units that communicate with a central control unit. In this braking system, a portion of the ABS control logic of a wheel is accomplished by the local regulating unit assigned to the applicable wheel, while the remainder of the ABS control logic for this wheel is accomplished by the central control unit. Because, in order to execute the ABS function, the central control unit must communicate with the local regulating units of the pressure control valves, connection cables suitable for this purpose must be provided or, if a data bus exists, it is occupied by the applicable data, which has a negative effect on the cost of cable installation and/or the data transmission speed.

In contrast, the purpose of the invention is to develop an electronically controlled braking system in which the drawbacks mentioned above are avoided.

This purpose is solved by providing an electronically controlled braking system, comprising a central control device (Z1; Z2), at least one pressure control valve (A) and at least one pressure regulation valve (B), or at least one pressure control valve (A), at least one pressure regulation valve (B) and at least one pressure regulation module (C), wherein a) the pressure control valve (A) is assigned to one vehicle wheel and is designed for wheel slippage-dependent control of brake pressure applied to a brake of the wheel and generated by a braking power actuator and/or brake valve that can be activated by the driver or by a pressure regulation valve (B), b) the pressure regulation valve (B) is designed for generation of driver-controlled brake pressure and includes a pressure sensor to monitor brake pressure, as well as control electronics, with which the brake pressure can be regulated, by variance comparison, either axle-by-axle or side-by-side, and can be transmitted to the wheel-specific pressure control valve (A), of which there is at least one, c) the pressure regulation module (C) is designed for generation of driver-controlled brake pressure and includes a pressure sensor to monitor brake pressure, as well as control electronics, with which the brake pressure can be regulated, by variance comparison, axle-by-axle, and can be transmitted directly to at least one wheel brake, and can be controlled on a wheel-by-wheel basis depending on wheel slippage, and d) the central control device (Z1) communicates only with the pressure regulation valve (B), of which there is at least one, and the pressure regulation module (C), of which there is at least one, or only with the pressure regulation valve (B), of which there is at least one, or e) the central control device (Z2) only communicates with the pressure control valve (A), of which there is at least one, to which brake pressure generated by the driver-actuated brake power actuator and/or brake valve can be directly applied, and with the pressure regulation valve (B), of which there is at least one, wherein f) a wheel slippage-dependent control for each braked wheel is additionally integrated into the control electronics of the pressure regulation valve (B), with which control an electric trigger signal can be generated for each pressure control valve (A) downstream from the pressure regulation valve (B).

The advantage of the electronically controlled braking system according to the invention is that, because of the complete integration of the wheel slippage-dependent control systems, such as ABS and/or TCS, into the regulating electronics of the pressure regulation valves, the corresponding connection lines between the central control device and the pressure control valves close to the wheels are eliminated, as the pressure control valves are triggered directly by the pressure regulation valves arranged on the chassis. A trigger signal for one or more wheel-specific pressure control valves is generated by the pressure regulation valves dependent on the difference between a measured actual rotational speed and a reference rotational speed. The resulting narrow wiring harness between the driver's cab and the chassis is advantageous, especially in commercial vehicles, as the driver's cab in such vehicles is tilted relative to the chassis, so that thick wiring harnesses run the risk of becoming kinked.

Furthermore, the CAN bus normally used for communication between the central control device and the regulating electronics of the pressure regulation valves proximate to the wheels is relieved, thus allowing for higher data transfer rates. In addition, due to the low manufacturing penetration that has become common practice today, the chassis and body of commercial vehicles are produced by different manufacturers. Consequently, and according to the invention, the bulk of the braking system, including the wheel slippage-dependent regulating electronics, can be pre-assembled on the chassis, so that during subsequent assembly of the body by partner companies very few additional steps are required to complete the braking system.

Advantageous enhancements and improvements of the electronically controlled braking system are possible by means of the measures described herein.

BRIEF DESCRIPTION OF THE DRAWING

Embodiments of the invention are depicted in the drawing and are explained in greater detail in the following description. The single FIGURE in the drawing shows a matrix, in which schematic examples of the electronically controlled braking system according to the invention are depicted.

DETAILED DESCRIPTION OF THE DRAWING

In the FIGURE shown in the drawing, examples of electronically controlled braking systems according to the invention are depicted schematically in a 3 column/4 line matrix. Variants of braking systems used in 2-axle commercial vehicles are depicted in the first column, while those used in 3-axle commercial vehicles are depicted in column 2 and column 3.

The abbreviation VA signifies "front axle," while "1.HA, 2.HA" signifies the first or second rear axle, respectively, wherein the second rear axle 2.HA can be a forward axle VL, a trailing axle NL, or a lift axle LA. In any event, the electronically controlled braking system according to the invention is not limited to commercial vehicles. Instead, it can be used in any type of vehicle. Furthermore, the invention is not limited to the variants depicted in the FIGURE. Instead, additional embodiments are conceivable.

As is known in the art, in electronically controlled braking systems the brake pressure reference value is generated by a driver-actuated braking power actuator (brake valve). A central control device Z1, Z2 emits an electric signal corresponding to the brake pressure reference value, triggering, according to the variants depicted in the FIGURE, either a pressure regulation valve B and/or a pressure regulation module C. The structure and function of the three different valve types A, B, and C listed in the matrix are described below.

In the electronically controlled braking system, pressure control valves A are used according to the prior art of European Patent Document EP 0 304 610 B1. These valves feature an electro-magnetically switched intake and exhaust valve. The pressure control valves A arranged close to the wheels receive brake pressure generated by a driver-actuated braking power actuator (brake valve) or a pressure regulation valve B and, if not triggered, transmit this brake pressure in unaltered form to the wheel brake of the corresponding wheel of the vehicle.

The pressure control valves A are activated for purposes of wheel slippage-dependent control of brake pressure, i.e., the intake and exhaust valve is switched accordingly to modulate brake pressure.

The pressure control valves A can be triggered electrically by a central control device Z2 when brake pressure is applied directly to the pressure control valves A by a braking power actuator (brake valve) (column 1, lines 3 and 4 of the matrix).

The wheel slippage-dependent control of brake pressure is used in Anti-Lock Braking System (ABS), Traction Control System (TCS), and driver-independent brake actuation for such purposes as vehicle stability (ESP, Electronic Stability Program), as well as to regulate distances between vehicles.

Instead of being triggered by a central control device Z2, the pressure control valves A can also be triggered by a pressure regulation valve B, as depicted on the basis of the variant in column 1, line 1 of the matrix. In this case, a pressure regulation valve B is provided on both the front axle VA and the rear axle HA, and these valves set the brake pressure for each axle to a value with which the operating brake action controlled by the driver or other equivalent specifications is achieved. For each axle, two wheel-specific pressure control valves A, which adjust brake pressure individually as needed, e.g., according to the rotational behavior of the braked wheel, are arranged downstream from the pressure regulation valve B.

Such a pressure regulation valve B preferably comprises an intake valve connected to a compressed air tank, an exhaust valve linked to the atmosphere, a pressure sensor, and control electronics, which adjust the brake pressure dependent on the electric brake pressure reference value of the central control device and a brake pressure actual value measured by the pressure sensor. This adjusted brake pressure is conducted through the pressure control valves A by pneumatic connection lines (not depicted) and transmitted to the brake cylinders of the individual wheels.

In addition, and in a manner which is significant to the invention, a wheel slip-dependent control system, such as an anti-lock braking system (ABS) or a traction control system (TCS), is integrated, for each individual braked wheel, into the control electronics of such a pressure regulation valve B, thereby generating, depending on the comparison between the actual rotational speed measured at the wheel in question and the corresponding reference rotational speed, an electric trigger signal for the pressure control valve A arranged downstream, which then, for example, modulates the brake pressure set on an axle-by-axle basis by the pressure regulation valve B. The mechanical structure of such a pressure regulation valve B is comparable to that of the device pictured in FIG. 1 of EP 0 845 397 A2.

In the embodiment in column 1, line 2 of the matrix, the front axle VA is equipped with a pressure regulation module C, which is triggered by the central control device Z1. Both the pressure regulation module C and the pressure regulation valve B contain an intake valve connected to a compressed air tank, an exhaust valve linked to the atmosphere, a pressure sensor, and control electronics. In an initial functional building block, the pressure regulation module C performs, as does the pressure regulation valve B described above, the task of regulating brake pressure axle by axle. Consequently, it sets the brake pressure on an axle-by-axle basis, depending on the brake pressure reference value and a brake pressure actual value measured by the pressure sensor.

In addition, the pressure regulation module C permits, in a second, integrated function block, adjustment to the rotational behavior of the braked wheels, e.g., in accordance with the known select-low method or the modified select-low method, which involves a higher share of slippage being allocated to one of the braked wheels (select-smart method). To this end, the control electronics of the pressure regulation module C, depending on the difference between the measured actual rotational speed and a reference rotational speed, generate an electric trigger signal for the intake valve and the exhaust valve of the pressure regulation module C, which thereby assume the function of a pressure control valve A. Accordingly, the ABS, TCS, and ESP functions for each individual wheel are integrated into the pressure regulation module C. In terms of its mechanical structure and its function, the pressure regulation module C corresponds to the device described in EP 0 845 397 A2, FIG. 1.

As with two-axle commercial vehicles, the various valve types A, B, and C can also be combined axle by axle in three-axle commercial vehicles. Thus, by using the pressure regulation valve B on a tandem axle, for example, it is possible to adjust the brake pressure individually for each side with the pressure regulation valves B, and to provide wheel-specific ABS and/or TCS action through the downstream pressure control valves A, as depicted in the embodiment in column 3, line 1 of the matrix. According to the examples from column 2, line 2 and column 2, line 3, the second rear axle 2.HA or the front axle VA could also be provided with a pressure regulation module C. The FIGURE does not depict the variant in which the front axle is provided with a pressure regulation module C and both rear axles 1.HA and 2.HA are provided with pressure regulation valves B and downstream pressure control valves A.

The embodiments of electronically controlled braking systems depicted in the matrix in the FIGURE are described in detail below:

According to the embodiment in column 1, line 1, a pressure regulation valve B triggered by the central control device Z1 is provided on both the front axle VA and the rear axle. Two wheel-specific pressure control valves A are arranged downstream from the two pressure regulation valves B. The embodiment in column 1, line 2 depicts a pressure regulation module C on the front axle VA and, on the rear axle HA, a pressure regulation valve B triggered by the central control device Z1, wherein the pressure regulation valve B controls two downstream pressure control valves A. According to the variant in column 1, line 3, two pressure control valves A are provided on the front axle VA, while a pressure regulation valve B with two downstream pressure control valves A are provided on the rear axle HA. The embodiment in column 1, line 4 is provided with two pressure control valves A on the front axle VA, which are triggered directly by the central control device Z2, as well as a pressure regulation module C on the rear axle HA.

In column 2, line 1 of the matrix, an embodiment is depicted in which a pressure regulation valve B, which is triggered by the central control device Z1, and two downstream pressure control valves A are provided on the front axle VA, on the first rear axle 1.HA, and on the second rear axle 2.HA. In contrast, in the embodiment depicted in column 2, line 2 the second rear axle 2.HA is not provided with an A-B-A valve combination, but rather with a single pressure regulation module C. And in contrast to the above, in the variant depicted on the last line of column 2 a pressure regulation module C is provided on the front axle VA. Finally, in the embodiment shown in column 3, line 1, two pressure regulation valves B are provided, which trigger the pressure control valves A of the wheels on both rear axles on a side-by-side rather than axle-by-axle basis.

In summary, in the embodiments depicted in the FIGURE, each vehicle axle is provided with two directly triggered pressure control valves A, or a pressure regulation valve B with two downstream pressure control valves A, or a pressure regulation module C. Alternatively, the pressure control valves A for individual wheels can be triggered on a side-by-side rather than axle-by-axle basis.

A multitude of electronically controlled braking systems can be depicted cost-effectively using the structural arrangement described above.

In addition to having a small number of components, the electronic braking system according to the invention is especially characterized by a simplified system of cables, as the central control device Z1 and/or Z2, in the case of an A-B-A axle configuration, only has to be wired to the pressure regulation valve B on this axle.

What is claimed is:

1. An electronically controlled braking system comprising:
    pressure control valves, each featuring an electromagnetically switched intake and exhaust valve, being arranged close to one of the wheels of the vehicle, adapted to receive brake pressure, adapted to transmit the brake pressure in unaltered form to a wheel brake of the one of the wheels when not triggered, and adapted to be activated for wheel slippage-dependent control of the brake pressure in which the intake and exhaust valve is switched to modulate the brake pressure,
    at least one pressure regulation device having a pressure sensor and control electronics, which adjust said brake pressure based on an electronic brake pressure reference value and an actual brake pressure value measured by the pressure sensor, and
    a central control device which communicates with each pressure regulation device or directly with anti-lock braking system valves,
    wherein the control electronics of the central control device have a wheel slippage-dependent control integrated therein.

2. The electronically controlled braking system according to claim 1, wherein the at least one pressure regulation device is a pressure regulation valve provided between two of said pressure control valves.

3. The electronically controlled braking system according to claim 2, wherein the pressure regulation valve is one of two pressure regulation valves provided on front and rear vehicle axles.

4. The electronically controlled braking system according to claim 2, wherein the pressure regulation valve is one of three pressure regulation valves provided on a front vehicle axle, a first rear vehicle axle, and a second rear vehicle axle.

5. The electronically controlled braking system according to claim 2, wherein the pressure regulation valve is one of three pressure regulation valves, one of the pressure regulation valves provided on a front vehicle axle, and two of the pressure regulation valves provided for side-by-side triggering of pressure control valves of wheels on first and second rear vehicle axles.

6. The electronically controlled braking system according to claim 2, wherein the pressure regulation valve is provided on a rear vehicle axle, and wherein two other pressure control valves are provided on a front vehicle axle.

7. The electronically controlled braking system according to claim 1, wherein said at least one pressure regulation device is a pressure regulation module which further provides adjustment to rotational behavior of braked wheels by allocating a higher share of slippage to one of the braked wheels.

8. The electronically controlled braking system according to claim 7, wherein the pressure regulation module is provided on a rear vehicle axle, and wherein two of said pressure control valves are provided on a front vehicle axle.

9. The electronically controlled braking system according to claim 1, wherein the wheel slippage-dependent control provides at least one of anti-lock braking control, traction control, and driver-independent brake actuation.

10. The electronically controlled braking system according to claim 1, wherein the at least one pressure regulation device includes a pressure regulation module on a front vehicle axle which further provides adjustment to rotational behavior of braked wheels by allocating a higher share of slippage to one of the braked wheels, and a pressure regulation valve on a rear vehicle axle provided between two of said pressure control valves.

11. The electronically controlled braking system according to claim 1, wherein the at least one pressure regulation device includes two pressure regulation valves respectively provided, between respective pairs of said pressure control valves, on a front vehicle axle and a first rear vehicle axle, and a pressure regulation module on a second rear vehicle axle which further provides adjustment to rotational behavior of slippage to one of the brakes wheels.

12. The electronically controlled braking system according to claim 1, wherein the at least one pressure regulation device includes a pressure regulation valve, between a pair of said pressure control valves, provided on a first rear vehicle axle, and two pressure regulation modules respectively provided on a front vehicle axle and a second rear vehicle axle, each of the pressure regulation modules further providing adjustment to rotational behavior of braked wheels by allocating a higher share of slippage to a respective one of the braked wheels.

* * * * *